United States Patent [19]

Komiya et al.

[11] Patent Number: 5,438,077

[45] Date of Patent: Aug. 1, 1995

[54] ION EXCHANGE RESINS CONTAINING GLYCIDYL ETHER SPACER GROUPS

[75] Inventors: Katsuo Komiya, Hikari; Toshikuni Koga, Shinnanyo; Yoshio Kato, Shinnanyo, all of Japan

[73] Assignee: Toson Corporation, Yamaguchi, Japan

[21] Appl. No.: 183,241

[22] Filed: Jan. 19, 1994

Related U.S. Application Data

[63] Continuation of Ser. No. 939,596, Sep. 2, 1992, abandoned.

[30] Foreign Application Priority Data

Sep. 6, 1991 [JP] Japan .................................. 3-254311

[51] Int. Cl.$^6$ .................. B01J 39/18; B01J 39/20; B01J 39/22
[52] U.S. Cl. ........................ 521/37; 521/30; 521/34; 521/36; 525/31; 525/107
[58] Field of Search .................. 521/34, 36, 30, 37; 525/31

[56] References Cited

U.S. PATENT DOCUMENTS

D. 566,775  12/1958  Hwa ........................................ 521/34
5,141,966   8/1992  Porath ..................................... 521/32

FOREIGN PATENT DOCUMENTS 2079356   4/1987  Japan ..................................... 521/34
2269754  11/1987  Japan ..................................... 521/34
1054004   3/1989  Japan ..................................... 521/34
1231949   9/1989  Japan ..................................... 521/34

OTHER PUBLICATIONS

Lee & Neville, "Handbook of Epoxy Resins", (5–32)–(5–40), 1967) McGraw-Hill (New York).

*Primary Examiner*—Fred Zitomer
*Attorney, Agent, or Firm*—Sughrue, Mion, Zinn, Macpeak & Seas

[57] ABSTRACT

An ion exchanger comprising a particle of an insoluble crosslinked polymer having alcoholic hydroxyl groups, as a base material, and a glycidyl-adduct of polyol and-/or its oligomer, as a spacer, wherein ion exchange groups are attached to the spacer.

10 Claims, No Drawings

ION EXCHANGE RESINS CONTAINING GLYCIDYL ETHER SPACER GROUPS

This is a Continuation of application Ser. No. 07/939,596 filed Sep. 2, 1992 now abandoned.

BACKGROUND OF THE INVENTION

1. Field of the Invention

The present invention relates to an ion exchanger useful for separation and purification of a biogenic polymer such as a protein or a nucleic acid, and particularly to a packing material for liquid chromatography.

2. Discussion of Background

Heretofore, for purification of a biogenic polymer, particularly a protein, ion exchange chromatography has been often used as a purification method whereby the property change of the sample is little. As an ion exchanger which has been used for this purpose, a polysaccharide-type exchanger represented by an ion exchanger of a cellulose base material may be mentioned. However, when packed into a column, such an ion exchanger presents poor permeability, and its resolution is rather low, since the carrier particles cannot be made small enough. Also, the durability of the packed column was poor. Further, an ion exchanger of a crosslinked agarose base material or a crosslinked synthetic polymer base material has been developed as a commercial product. However, such a packing material has the drawback that as its hardness increases, the capacity for binding a sample such as a protein tends to decrease. To solve this problem, it has been proposed to prepare an ion exchanger by using a semi-rigid or chemically modified silica gel having hydroxyl groups as the base material, and to graft-polymerize an acrylamide derivative, an acrylic acid ester or vinyl acetate in the presence of a cerium (VI) salt as a catalyst to form a spacer, and it has been suggested that the capacity for binding a sample can thereby be improved (EP 337144A). However, the ion exchanger disclosed in this publication, wherein an oligomer of an acrylamide derivative or a (meth)acrylic acid ester is used as a spacer or a chemical bond-type silica gel is used as a base material, is gradually hydrolyzed when contacted with a strong acid or a strong base, whereby a decrease in the ion exchange capacity or in the capacity for binding a protein is observed. Washing of a separation column by means of a strong acid or a strong base is frequently used for cleaning the column, especially for the separation and purification of a biogenic polymer. Further, vinyl acetate is hardly graft-polymerized, and the resulting hydroxyl groups are all secondary hydroxyl groups and have poor reactivity, whereby it has been difficult to introduce ion exchange groups.

Among the above-mentioned various ion exchangers, there is no ion exchanger which is excellent in column permeability and which has a large capacity for binding a protein and excellent chemical stability against a reagent to be used for cleaning the column or for regeneration treatment.

SUMMARY OF THE INVENTION

It has been found that the above various problems can be solved by using, as the base material of an ion exchanger, a polymer material which is an insoluble crosslinked polymer having alcoholic hydroxyl groups and of which the electrostatic interaction with a water soluble protein in a neutral buffer solution is substantially negligible, adding to such a base material a polyglycidyl ether of a polyol or an epihalohydrin adduct of a polyol, and/or an oligomer produced by an addition reaction or dehydrohalogenation condensation of such a compound, as a spacer, and introducing ion exchange groups to this spacer.

Thus, the present invention provides an ion exchanger comprising a particle of an insoluble crosslinked polymer having alcoholic hydroxyl groups as a base material and a glycidyl-adduct of a polyol and/or its oligomer as a spacer, where ion exchange groups are attached to the spacer.

Now, the present invention will be described in further detail with reference to the preferred embodiments.

The insoluble crosslinked polymer to be used in the present invention is an insoluble crosslinked polymer having alcoholic hydroxyl groups. Specifically, it preferably is a hydrophilic gel filtration carrier such as a semi-rigid gel or a crosslinked agarose gel composed mainly of a hydrophilic poly(meth)acrylic acid ester or a polyvinyl alcohol.

It is important that the insoluble crosslinked polymer to be used in the present invention presents good permeability, since it is often used packed into a column. Accordingly, its particle shape is preferably spherical. Further, in order to secure an adequate capacity for binding a sample, a proper pore size and porosity are required so that a protein, etc., to be treated can penetrate into pores in the interior of the carrier. The average pore diameter is preferably from about 30 nm to about 1,000 nm. The porosity should be determined taking a balance of the mechanical strength and the surface area of the base material into consideration. The porosity is preferably from 30% to 95%, although it depends on the physical properties of the base material. With respect to electrostatic interaction, if ion exchange groups are initially present on the base material itself, such ion exchange groups are influential over the ion exchange groups to be subsequently attached, which makes the determination of the separating conditions complicated. Therefore, the ion exchange capacity of the base material is preferably not higher than 0.05 meq/ml.

As the spacer material for the present invention, a polyglycidyl ether of a polyol or an epihalohydrin reaction product of a polyol is employed. The polyol may, for example, be a non-ionic alcohol such as ethylene glycol, glycerol, 1,4-butanediol, sorbitol, polyethylene glycol (polymerization degree: not higher than 9), or propylene glycol (polymerization degree: not higher than 3). In addition to the above polyol derivative, epihalohydrin or glycidol may preferably be used in combination, although the weight ratio of such an additional compound should be smaller than the polyol derivative.

The ion exchange groups to be attached to the spacer, may, preferably, be anion exchange groups such as quaternary ammonium groups or primary to tertiary amino groups, or cation exchange groups such as sulfonic acid groups or carboxylic acid groups. So long as anion and cation exchange groups are not mixed, a plurality of types of ion exchange groups may be present in a mixed state. If anion and cation exchange groups are mixed, the smaller should be less than ⅓ the equivalent of the larger.

To prepare the ion exchanger of the present invention, the base material crosslinked polymer particles are dispersed in water or in an organic solvent and then the spacer raw material and an alkali metal hydroxide are added thereto, followed by an addition reaction under a strongly alkaline condition for epoxy-activation. Then, ion exchange groups are introduced to the spacer, and the remaining epoxy groups are ring-opened with water under an alkaline or acidic condition. Otherwise, depending upon the type of the desired ion exchanger, the base material, the spacer raw material and the raw material for introducing ion exchange groups may be mixed, and the addition reaction and introduction of ion exchange groups may be conducted under a strongly alkaline condition.

The ion exchanger thus obtained is excellent in column permeability and has a large capacity for binding a protein, and it is an ion exchanger having excellent chemical stability against reagents used for cleaning a column or for regeneration treatment.

Now, the present invention will be described in further detail with reference to Examples. However, it should be understood that the present invention is by no means restricted to such specific Examples.

EXAMPLE 1

Preparation of a Strong Cation Exchanger

As the base material, 60 ml of a hydrophilic gel filtration chromatography (GFC) medium having alcoholic hydroxyl groups (Toyo Pearl HW65F, manufactured by TOSOH CORPORATION, average pore diameter: about 100 nm) was suspended in 70 ml of water, and 120 g of glycerol polyglycidyl ether (Denacol EX-314, manufactured by Nagase Kasei Kogyo K.K.) and 30 g of sodium sulfite were added thereto. The mixture was stirred and mixed at 55° C. for 8 hours. The reaction product was subjected to filtration under suction, and the solid content thereby obtained was washed with water. Then, the entire solid content was dispersed in 150 ml of 0.1N hydrochloric acid, and the dispersion was stirred and mixed at 50° C. for two hours. The product was subjected to filtration under suction, and the solid content thereby obtained was washed with water. The ion exchanger thus obtained had an ion exchange capacity of 0.08 meq/ml and showed a capacity for binding 101 mg/ml of lysozyme in a 20 mM phosphate buffer solution of pH 6.0. Further, when the bound lysozyme was washed with 20 mM phosphate buffer solution containing 0.5M sodium chloride, lysozyme was recovered quantitatively.

20 ml of this ion exchanger was immersed in 60 ml of each of 0.5N sodium hydroxide and 0.5N hydrochloric acid and left to stand at 25° C. for 4 weeks, whereupon the ion exchange capacity and the capacity for binding lysozyme were measured, whereby the changes were found to be less than 5%.

EXAMPLE 2

Preparation of a Weak Anion Exchanger

As the base material, 50 ml of crosslinked agarose particles (Sepharose CL4B, manufactured by Pharmacia Company) were suspended in 50 ml of water, and 150 g of trimethylol propane triglycidyl ether (Epiol TMP-100, manufactured by Nippon Oil and Fat Company Limited), and 80 g of diethylamino ethanol and sodium hydroxide were added. The mixture was stirred and mixed at 40° C. for 5 hours. The reaction product was subjected to repeated decantation to wash the solid content with water. Then, the entire solid content was dispersed in 150 ml of a 0.1M sodium carbonate solution, and the dispersion was stirred and mixed at 30° C. for 8 hours. The product was subjected to filtration. The solid content was washed with water.

The ion exchanger thus obtained had an ion exchange capacity of 0.11 meq/ml and showed a capacity for binding 120 mg/ml of bovine serum albumin (BSA) in a 50 mM tris-hydrochloric acid buffer solution of pH 8.3. Further, when the bound BSA was washed with a 50 mM tris-hydrochloric acid buffer solution containing 0.5M sodium chloride, BSA was recovered quantitatively.

20 ml of this ion exchanger was immersed in 60 ml of 0.5N sodium hydroxide and left to stand at 25° C. for 4 weeks, whereupon the ion exchange capacity and the capacity for binding BSA were measured, whereby the changes were found to be less than 5%.

EXAMPLE 3

Preparation of a Strong Anion Exchanger

As the base material, 50 ml of a hydrophilic GFC medium having alcoholic hydroxyl groups (Toyo Pearl HW55F, manufactured by TOSOH CORPORATION, average pore diameter: about 30 nm) was suspended in 60 ml of water, and 120 g of sorbitol polyglycidyl ether (Denacol EX-611, manufactured by Nagase Kasei Kogyo K.K.), 20 g of trimethylamine hydrochloride and 9 g of sodium hydroxide were added thereto. The mixture was stirred and mixed at 45° C. for 6 hours. The reaction product was subjected to filtration under suction, and the solid content thereby obtained was washed with water. Then, the entire solid content was dispersed in 150 ml of 0.1N hydrochloric acid, and the dispersion was stirred and mixed at 50° C. for two hours. The product was subjected to filtration under suction, and the solid content thereby obtained was washed with water.

The ion exchanger thus obtained had an ion exchange capacity of 0.30 meq/ml and showed a BSA-binding capacity of 83 mg/ml in a 50 mM tris-hydrochloric acid buffer solution of pH 8.3. Further, when the bound BSA was washed with a 50 mM tris-hydrochloric acid buffer solution containing 0.5M sodium chloride, BSA was recovered quantitatively.

20 ml of this ion exchanger was immersed in a 60 ml of each of 0.5N sodium hydroxide and 0.5N hydrochloric acid and left to stand at 25° C. for 4 weeks, whereupon the ion exchange capacity and the BSA-binding capacity were measured, whereby the changes were found to be less than 5%.

EXAMPLE 4

Preparation of a Strong Anion Exchanger

As the base material, 60 ml of a hydrophilic GFC medium having alcoholic hydroxyl groups (Toyo Pearl HW65F, manufactured by TOSOH CORPORATION, average pore diameter: about 100 nm) was washed with 1,4-dioxane. Then, the entire solid content was suspended in 80 ml of 1,4-dioxane, and 70 g of glycerol polyglycidyl ether (Denacol EX-314, manufactured by Nagase Kasei Kogyo K.K.), 11.3 g of trimethylamine hydrochloride and 4.6 g of sodium hydroxide were added thereto. The mixture was stirred and mixed at 45° C. for 12 hours. The reaction product was subjected to filtration under suction, and the solid content thereby obtained was washed with water. Then, the entire solid content was dispersed in 150 ml of 0.1N hydrochloric acid, and the dispersion was stirred and mixed at 50° C. for two hours. The product was subjected to filtration under suction, and the solid content was washed with water.

The ion exchanger thus obtained had an ion exchange capacity of 0.26 meq/ml, and showed a BSA-binding capacity of 135 mg/ml in a 50 mM tris-hydrochloric buffer solution of pH 8.3. Further, when the bound BSA was washed with a 50 mM tris-hydrochloric acid buffer solution containing 0.5M sodium chloride, BSA was recovered quantitatively.

20 ml of this ion exchanger was immersed in 60 ml of each of 0.5N sodium hydroxide and 0.5N hydrochloric acid and left to stand at 25° C. for 4 weeks, whereupon the ion exchange capacity and the BSA-binding capacity were measured, whereby the changes were found to be less than 5%.

EXAMPLE 5

Preparation of a Strong Cation Exchanger

As the base material, 60 ml of a hydrophilic GFC medium having alcoholic hydroxyl groups (Toyo Pearl HW75F, manufactured by TOSOH CORPORATION, average pore diameter: about 500 nm) was suspended in 60 ml of water, and 50 g of glycerol polyglycidyl ether (Denacol EX-314, manufactured by Nagase Kasei Kogyo K.K.), 9 g of epichlorohydrin and 6 g of sodium hydroxide were added thereto. The mixture was stirred and mixed at 50° C. for 3 hours. The reaction product was subjected to filtration under suction, and the solid content thereby obtained was washed sequentially with water, acetone and water. Then, the entire solid content was dispersed in 100 ml of water, and 30 g of sodium sulfite was added thereto. The mixture was stirred and mixed at 55° C. for 8 hours. The reaction product was subjected to filtration under suction, and the solid content thereby obtained was washed with water.

Then, the entire solid content was dispersed in 150 ml of 0.1N hydrochloric acid, and the dispersion was stirred and mixed at 50° C. for two hours. The product was subjected to filtration under suction, and the solid content thereby obtained was washed with water.

The ion exchanger thus obtained had an ion exchange capacity of 0.13 meq/ml, and showed a lysozyme-binding capacity of 70 mg/ml in a 20 mM phosphate buffer solution of pH 6.0. Further, when the bound lysozyme was washed with a 20 mM phosphate buffer solution containing 0.5M sodium chloride, lysozyme was recovered quantitatively.

20 ml of this ion exchanger was immersed in 60 ml of each of 0.5N sodium hydroxide and 0.5N hydrochloric acid and left to stand at 25° C. for 4 weeks, whereupon the ion exchange capacity and the lysozyme-binding capacity were measured, whereby the changes were found to be less than 5%.

EXAMPLE 6

Preparation of a Weak Cation Exchanger

As the base material, 50 ml of a hydrophilic GFC medium having alcoholic hydroxyl groups (Toyo Pearl HW65F, manufactured by TOSOH CORPORATION, average pore diameter: about 100 nm) was suspended in 50 ml of water, and 100 g of ethylene glycerol polyglycidyl ether and 2 g of sodium hydroxide were added thereto. The mixture was stirred and mixed at 50° C. for 5 hours. The reaction product was subjected to filtration under suction, and the solid content thereby obtained was washed sequentially with water, acetone and water. Then, the entire solid content was dispersed in 50 ml of water, and 60 g of sodium monochloro acetate and 30 g of sodium hydroxide were added thereto. The mixture was stirred and mixed at 50° C. for 4 hours. The product was subjected to filtration under suction, and the solid content thereby obtained was washed with water.

The ion exchanger thus obtained had an ion exchange capacity of 0.14 meq/ml, and showed a lysozyme-binding capacity of 95 mg/ml in a 20 mM phosphate buffer solution of pH 6.0. Further, when the bound lysozyme was washed with a 20 mM phosphate buffer solution containing 0.5M sodium chloride, lysozyme was recovered quantitatively.

20 ml of this ion exchanger was immersed in 60 ml of each of 0.5N sodium hydroxide and 0.5N hydrochloric acid and left to stand at 25° C. for 4 weeks, whereupon the ion exchange capacity and the lysozyme-binding capacity were measured, whereby the changes were found to be less than 5%.

COMPARATIVE EXAMPLE 1

Preparation of a Strong Cation Exchanger

As the base material, 60 ml of a hydrophilic GFC medium having alcoholic hydroxyl groups (Toyo Pearl HW75F, manufactured by TOSOH CORPORATION, average pore diameter: about 500 nm) was suspended in 60 ml of water, and 23 g of epichlorohydrin and 6 g of sodium hydroxide were added thereto. The mixture was stirred and mixed at 50° C. for 3 hours. The reaction product was subjected to filtration under suction, and the solid content thereby obtained was washed sequentially with water, acetone and water. Then, the entire solid content was dispersed in 100 ml of water, and 30 g of sodium sulfite was added thereto, and the mixture was stirred and mixed at 55° C. for 8 hours. The reaction product was subjected to filtration under suction, and the solid content thereby obtained was washed with water. Then, the entire solid content was dispersed in 150 ml of 0.1N hydrochloric acid, and the mixture was stirred and mixed at 50° C. for two hours. The product was subjected to filtration under suction, and the solid content thereby obtained was washed with water.

The ion exchanger thus obtained had an ion exchange capacity of 0.13 meq/ml and showed a lysozyme-binding capacity of 35 mg/ml in a 20 mM phosphate buffer solution of pH 6.0. Namely, the protein-binding capacity was half the capacity in Example 5. Further, when the bound lysozyme was washed with a 20 mM phosphate buffer solution containing 0.5M sodium chloride, lysozyme was recovered quantitatively.

20 ml of this ion exchanger was immersed in 60 ml of each of 0.5N sodium hydroxide and 0.5N hydrochloric acid and left to stand at 25° C. for 4 weeks, whereupon the ion exchange capacity and the lysozyme-binding capacity were measured, whereby the changes were found to be less than 5%.

COMPARATIVE EXAMPLE 2

Preparation of a Strong Anion Exchanger

As the base material, 60 ml of a hydrophilic GFC medium having alcoholic hydroxyl groups (Toyo Pearl HW65F, manufactured by TOSOH CORPORATION, average pore diameter: about 100 nm) was suspended in 60 ml of water, and 23 g of epichlorohydrin and 6 g of sodium hydroxide were added thereto. The mixture was stirred and mixed at 50° C. for 3 hours. The reaction product was subjected to filtration under suction, and the solid content thereby obtained was washed with water and 1,4-dioxane. Then, the entire solid content was suspended in 80 ml of 1,4-dioxane, and 22.6 g of trimethylamine hydrochloride and 9.2 g of sodium hydroxide were added thereto. The mixture was stirred and mixed at 40° C. for 12 hours. The reaction product was subjected to filtration under suction, and the solid content thereby obtained was washed with water. Then, the entire solid content was dispersed in 150 ml of 0.1N hydrochloric acid, and the dispersion was mixed at 50° C. for two hours. The reaction product was subjected to filtration under suction, and the solid content thereby obtained was washed with water.

The ion exchanger thus obtained had an ion exchange capacity of 0.20 meq/ml and showed a BSA-binding capacity of 50 mg/ml in a 50 mM tris-hydrochloric acid buffer solution of pH 8.3. Namely, the protein-binding capacity was half the capacity in Example 4. Further, when the bound BSA was washed with a 50 mM tris-hydrochloric acid buffer solution containing 0.5M sodium chloride, BSA was recovered quantitatively.

20 ml of this ion exchanger was immersed in 60 ml of each of 0.5N sodium hydroxide and 0.5N hydrochloric acid and left to stand at 25° C. for 4 weeks, whereupon the ion exchange capacity and the BSA-binding capacity were measured, whereby the changes were found to be less than 5%.

COMPARATIVE EXAMPLE 3

Preparation of a Strong Anion Exchanger

As the base material, 50 ml of a hydrophilic GFC medium having alcoholic hydroxyl groups (Toyo Pearl HW65F, manufactured by TOSOH CORPORATION, average pore diameter: about 100 nm) was suspended in 700 ml of water, and 113 g of N,N-trimethyl ammonium ethyl acrylamide was added thereto. The temperature was adjusted to 25° C., and oxygen in the container was removed by substitution with argon. 100 ml of a 0.4M cesium nitrate ammonium solution in 1N nitric acid was added thereto. The mixture was stirred and mixed for 3 hours. The reaction product was subjected to filtration under suction, and the solid content thereby obtained was washed sequentially with water, 10% acetic acid containing 0.2M sodium sulfite, 0.2M sodium acetate and water.

The ion exchanger thus obtained had an ion exchange capacity of 0.15 meq/ml and showed a BSA-binding capacity of 70 mg/ml in a 50 mM tris-hydrochloric acid buffer solution of pH 8.3. The protein-binding capacity was about half the capacity in Example 4. Further, when the bound BSA was washed with the 50 mM tris-hydrochloric acid buffer solution containing 0.5M sodium chloride, BSA was recovered quantitatively.

20 ml of this ion exchanger was immersed in 60 ml of 0.5N sodium hydroxide and left to stand at 25° C. for 4 weeks, whereupon the ion exchange capacity and the BSA-binding capacity were measured, whereby the ion exchange capacity was found to have decreased by 15%, and the BSA-binding capacity was also found to have decreased by 10%.

APPLICATION EXAMPLE 1

The packing material obtained in Example 1 was packed into a glass column (150×16 mm) and equilibrated with a 20 mM phosphoric acid buffer solution of pH 6.0, and a mixture containing 10 mg of ribonuclease, 5 mg of cytochrome C and 5 mg of lysozyme, was subjected to linear gradient elution with from 0 to 500 mM sodium chloride, whereby separation was excellent.

APPLICATION EXAMPLE 2

The packing material obtained in Example 4 was packed into a glass column (150×16 mm) and equilibrated with a 20 mM piperazine-hydrochloric acid buffer solution of pH 8.3, and 2 mg of commercially available β-lactoglobulin was subjected to linear gradient elution with from 0 to 300 mM sodium chloride, whereby separation of β-lactoglobulin A and B was excellent.

APPLICATION EXAMPLE 3

The packing material obtained in Example 6 was packed into a glass column (150×16 mm) and equilibrated with a 20 mM phosphoric acid buffer solution of pH 6.0, and a mixture of angiotensin I, II and III each in an amount of 0.03 mg was subjected to a linear gradient elution with from 0 to 500 mM sodium chloride, whereby separation was excellent.

APPLICATION EXAMPLE 4

The packing material obtained in Example 4 was packed into a glass column (150×16 mm) and equilibrated with a 20 mM tris-hydrochloric acid buffer solution of pH 8.3, and a mixture comprising 4 mg of commercially available carbonic anhydrase, 8 mg of transferrin, 10 mg of ovoalubumin and 10 mg of trypsin inhibitor, was subjected to a linear gradient elution with from 0 to 500 mM sodium chloride, whereby separation was excellent.

As described in the foregoing, the ion exchanger of the present invention has an excellent ability to separate a biogenic polymer, presents excellent column permeation characteristics and has a large capacity for binding a protein and excellent chemical stability.

What is claimed is:

1. An ion exchanger comprising a base material, a connecting group and at least one ion exchange group, where the base material has an alcoholic hydroxyl group, the connecting group is a glycidyl-adduct of a polyol and/or its oligomer, and the at least one ion exchange group is a sulfonic acid group or a quaternary ammonium group, the ion exchanger consisting essentially of porous particles having an average pore diameter of 30–1,000 nm in diameter and having a porosity of 30 to 95%, the base material being an insoluble crosslinked polymer material which is in gel form, where:

the connecting group has a first terminal end and a second terminal end;

the first terminal end of the connecting group is bonded to the base material through the alcoholic hydroxyl group of the base material; and the second terminal end of the connecting group is bonded to the at least one ion exchange group by at least one glycidyl group of the glycidyl-adduct of a polyol and/or its oligomer.

2. The ion exchanger according to claim 1, wherein the insoluble crosslinked polymer material is porous and the material is spherical in shape.

3. The ion exchanger according to claim 1, wherein the ion exchange capacity of the insoluble crosslinked polymer is not higher than 0.05 meq/ml.

4. The ion exchanger according to claim 1, wherein the insoluble crosslinked polymer is a hydrophilic gel filtration carrier.

5. The ion exchanger according to claim 1, wherein the spacer is a polyglycidyl ether of a polyol or a reaction product of a polyol with epihalohydrin.

6. The ion exchanger according to claim 6, wherein the polyol is ethylene glycol, glycerol, 1,4-butanediol, sorbitol, polyethylene glycol having a polymerization degree of not higher than 9 or propylene glycol having a polymerization degree of not higher than 3.

7. The ion exchanger according to claim 1, wherein the ion exchanger group is a quaternary ammonium group.

8. The ion exchanger according to claim 1, wherein the ion exchange group is a sulfonic acid group.

9. The ion exchanger according to claim 7, wherein the quaternary ammonium group is a trimethyl-2-hydroxypropyl ammonium group.

10. The ion exchanger of claim 9, wherein said ion exchanger is spherical, hydrophobic and has an ion exchange capacity of not higher than 0.05 meq/ml.

* * * * *